United States Patent
Schaad

(10) Patent No.: US 9,495,545 B2
(45) Date of Patent: Nov. 15, 2016

(54) AUTOMATICALLY GENERATE ATTRIBUTES AND ACCESS POLICIES FOR SECURELY PROCESSING OUTSOURCED AUDIT DATA USING ATTRIBUTE-BASED ENCRYPTION

(71) Applicant: Andreas Schaad, Bruchsal (DE)

(72) Inventor: Andreas Schaad, Bruchsal (DE)

(73) Assignee: SAP SE, Walldorf (DE)

( * ) Notice: Subject to any disclaimer, the term of this patent is extended or adjusted under 35 U.S.C. 154(b) by 44 days.

(21) Appl. No.: 14/540,205

(22) Filed: Nov. 13, 2014

(65) Prior Publication Data
US 2016/0140347 A1    May 19, 2016

(51) Int. Cl.
*G06F 21/60* (2013.01)
*G06F 21/62* (2013.01)
*H04L 9/30* (2006.01)
*H04L 29/06* (2006.01)

(52) U.S. Cl.
CPC ......... *G06F 21/602* (2013.01); *G06F 21/6218* (2013.01); *G06F 21/6227* (2013.01); *H04L 9/3073* (2013.01); *H04L 63/1416* (2013.01)

(58) Field of Classification Search
CPC .......................... H04L 9/3073; H04L 63/1416
See application file for complete search history.

(56) References Cited

U.S. PATENT DOCUMENTS

| | | | | |
|---|---|---|---|---|
| 6,347,374 B1* | 2/2002 | Drake | ............... | G06F 21/554 709/224 |
| 7,561,875 B1* | 7/2009 | Eberle | ............... | G06F 11/2294 455/41.2 |
| 7,689,562 B2 | 3/2010 | Schaad et al. | | |
| 7,831,978 B2 | 11/2010 | Schaad | | |
| 8,079,081 B1* | 12/2011 | Lavrik | ............... | H04L 41/069 709/223 |
| 8,130,947 B2 | 3/2012 | Kerschbaum et al. | | |
| 8,156,553 B1* | 4/2012 | Church | ............... | G06Q 10/06 709/224 |
| 8,559,631 B1* | 10/2013 | Waters | ............... | H04L 9/085 380/28 |
| 8,620,713 B2 | 12/2013 | Schaad | | |
| 8,689,352 B2 | 4/2014 | Schaad et al. | | |
| 8,726,151 B2 | 5/2014 | Rahaman et al. | | |

(Continued)

OTHER PUBLICATIONS

Zhu Y, Hu H, Ahn GJ, Yau SS. Efficient audit service outsourcing for data integrity in clouds. Journal of Systems and Software. May 31, 2012;85(5):1083-95.*

*Primary Examiner* — James Turchen
(74) *Attorney, Agent, or Firm* — Fish & Richardson P.C.

(57) ABSTRACT

Methods, systems, and computer-readable storage media for secure storage of and selective access to encrypted audit data. Implementations include actions of receiving a set of audit data in response to occurrence of an incident, determining a set of static audit data and a set of dynamic audit data based on the set of audit data, encrypting items in the set of static audit data using a first attribute-based encryption scheme to provide a set of encrypted static audit data, and items in the set of dynamic audit data using a second attribute-based encryption scheme to provide a set of encrypted dynamic audit data, and transmitting the set of encrypted static audit data and the set of encrypted dynamic audit data to an off-premise database for storage and selective access.

14 Claims, 5 Drawing Sheets

(56) References Cited

U.S. PATENT DOCUMENTS

| | | | |
|---|---|---|---|
| 8,751,282 B2 | 6/2014 | Schaad | |
| 8,788,313 B2 | 7/2014 | Schaad | |
| 8,984,583 B2* | 3/2015 | Bhatti | G06F 21/45 726/1 |
| 2004/0139115 A1* | 7/2004 | Schmidt | G06K 15/00 |
| 2005/0114321 A1* | 5/2005 | DeStefano | H04L 43/02 |
| 2006/0004588 A1* | 1/2006 | Ananda | G06Q 20/3674 705/67 |
| 2007/0011300 A1* | 1/2007 | Hollebeek | G06F 11/0715 709/224 |
| 2007/0266138 A1* | 11/2007 | Spire | G06F 11/0709 709/223 |
| 2007/0283194 A1* | 12/2007 | Villella | G06F 11/3476 714/57 |
| 2008/0262860 A1* | 10/2008 | Schneider | G06Q 10/10 705/1.1 |
| 2009/0080658 A1* | 3/2009 | Waters | G06F 21/6218 380/277 |
| 2011/0071958 A1* | 3/2011 | Grody | G06Q 40/00 705/36 R |
| 2011/0145593 A1* | 6/2011 | Auradkar | G06F 21/6218 713/189 |
| 2012/0030122 A1 | 2/2012 | Rahaman et al. | |
| 2012/0066547 A1* | 3/2012 | Gilbert | H04L 41/065 714/26 |
| 2012/0300936 A1* | 11/2012 | Green | H04L 9/3073 380/278 |
| 2012/0311157 A1* | 12/2012 | Erickson | G06F 9/541 709/226 |
| 2013/0013922 A1* | 1/2013 | Kerschbaum | H04L 63/062 713/168 |
| 2013/0238785 A1* | 9/2013 | Hawk | G06F 9/5072 709/224 |
| 2013/0246925 A1* | 9/2013 | Ahuja | H04L 63/20 715/738 |
| 2013/0346163 A1* | 12/2013 | Kemmer | G06Q 10/0639 705/7.41 |
| 2014/0052985 A1* | 2/2014 | Yang | H04L 63/0428 713/168 |
| 2014/0068696 A1 | 3/2014 | Schaad | |
| 2014/0081671 A1 | 3/2014 | Schaad | |
| 2014/0136360 A1 | 5/2014 | Schaad | |
| 2014/0201520 A1* | 7/2014 | Yacobi | H04L 9/3073 713/158 |
| 2014/0229736 A1* | 8/2014 | Asim | H04L 9/0847 713/171 |
| 2014/0310564 A1* | 10/2014 | Mallige | G06F 11/0781 714/47.1 |
| 2015/0046985 A1* | 2/2015 | D'Souza | H04L 63/08 726/4 |
| 2015/0149811 A1* | 5/2015 | Kilian | G05B 19/0426 714/2 |
| 2016/0044035 A1* | 2/2016 | Huang | H04L 63/0272 726/4 |

\* cited by examiner

AUTOMATICALLY GENERATE ATTRIBUTES AND ACCESS POLICIES FOR SECURELY PROCESSING OUTSOURCED AUDIT DATA USING ATTRIBUTE-BASED ENCRYPTION

BACKGROUND

Entities, such as software developers and/or vendors, provide software and services. For example, a software vendor can provide one or more applications and/or platforms to one or more customers. In some examples, an application is developed and tested during a design-time, is deployed to a customer landscape during a deploy-time, and is executed on the customer landscape during a run-time. In some examples, the customer landscape includes one or more computing devices (e.g., client computing devices, server computing devices) and one or more data stores (e.g., databases) that are used to execute the application.

The software vendor can provide application maintenance services during the run-time. For example, incidents can occur, which result from an error and/or unexpected performance of the application. In some examples, and in response to an incident, audit data can be provided and can include data associated with one or more parameters that may be relevant to the incident (e.g., an identifier associated with a computing device that resulted in an error, a time/date of the incident, a user that was logged in at the time of the incident). In some examples, the audit data can include customer-sensitive data, which is accessed by the software vendor during resolution and/or correction of the incident.

SUMMARY

Implementations of the present disclosure include computer-implemented methods for secure storage of and selective access to encrypted audit data. In some implementations, actions include receiving a set of audit data in response to occurrence of an incident, determining a set of static audit data and a set of dynamic audit data based on the set of audit data, encrypting items in the set of static audit data using a first attribute-based encryption scheme to provide a set of encrypted static audit data, and items in the set of dynamic audit data using a second attribute-based encryption scheme to provide a set of encrypted dynamic audit data, and transmitting the set of encrypted static audit data and the set of encrypted dynamic audit data to an off-premise database for storage and selective access. Other implementations of this aspect include corresponding systems, apparatus, and computer programs, configured to perform the actions of the methods, encoded on computer storage devices.

These and other implementations can each optionally include one or more of the following features: the first attribute-based encryption scheme includes ciphertext policy attribute-based encryption, and the second attribute-based encryption scheme includes key policy attribute-based encryption; actions further include receiving an application hierarchy and a software component hierarchy, wherein access structures to respectively access encrypted items in the set of encrypted static audit data and encrypted items in the set of encrypted dynamic audit data are provided based on the application hierarchy and a software component hierarchy; the application hierarchy is received from a component of a customer landscape, on which an application associated with the audit data is executed, and the software component hierarchy is received from a software vendor that provided the application; actions further include receiving context information, wherein an access structure for accessing encrypted items in the set of encrypted dynamic audit data is provided based on the context information; the set of audit data is received in response to occurrence of an incident involving an application; and the incident results from an error in an application executed on a customer landscape.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to providing secure storage of and selective access to encrypted audit data. In some implementations, a set of audit data is provided in response to occurrence of an incident associated with an application executing on a customer landscape. In some examples, a set of static audit data and a set of dynamic audit data are provided based on the set of audit data. Items in the set of static audit data are encrypted using a first attribute-based encryption scheme to provide a set of encrypted static audit data, and items in the set of dynamic audit data are encrypted using a second attribute-based encryption scheme to provide a set of encrypted dynamic audit data. The set of encrypted static audit data and the set of encrypted dynamic audit data are provided to an off-premise database for storage and selective access. In some implementations, and as described in further detail herein, users requesting access to encrypted data must have appropriate attributes to be granted access.

Figure 1:
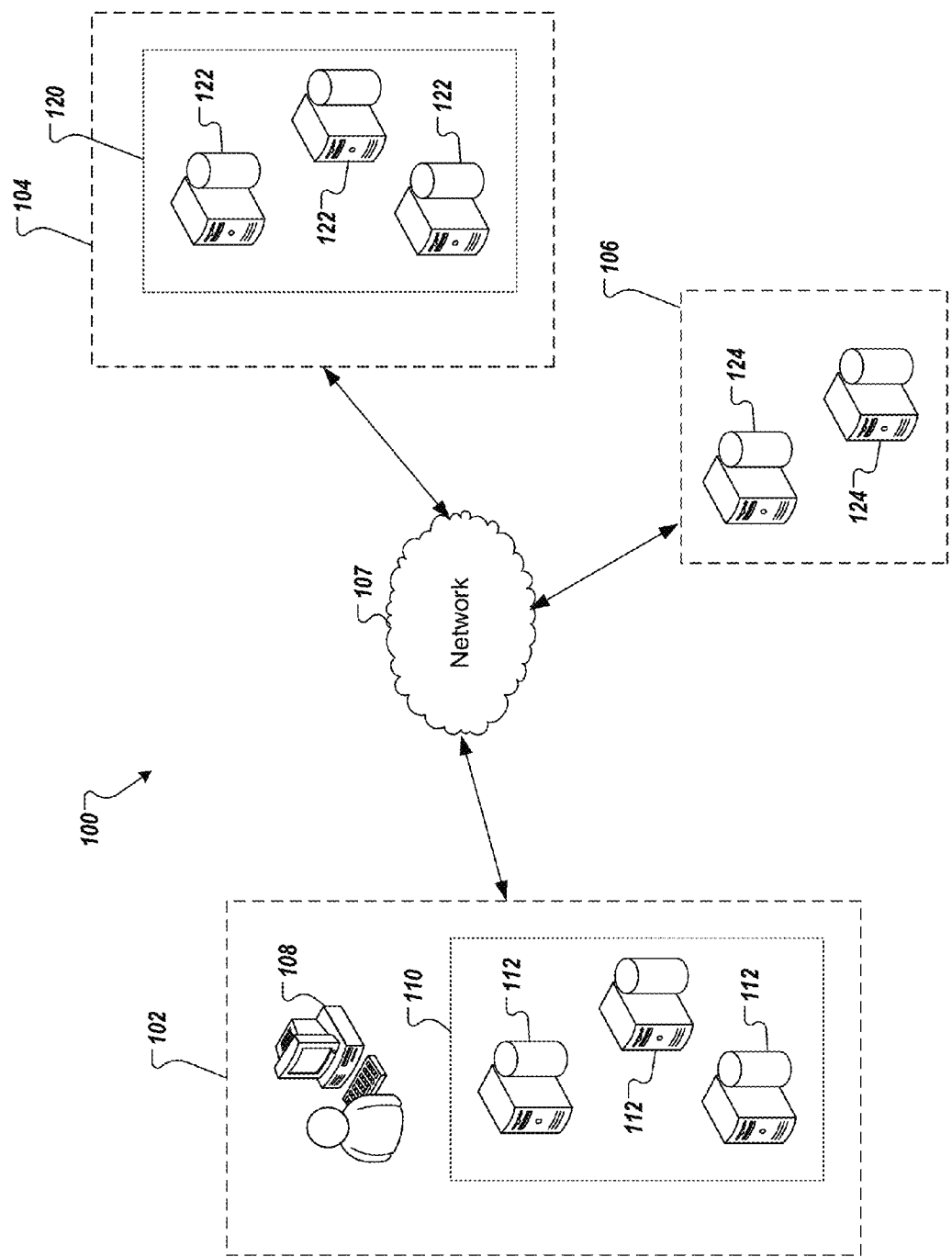
FIG. 1 depicts an example high-level architecture in accordance with implementations of the present disclosure.

FIG. 1 depicts an example architecture 100 in accordance with implementations of the present disclosure. The example architecture 100 of FIG. 1 includes a vendor system 102, a customer system 104, an external system 106 and a network 107. In the depicted example, the vendor system 102 includes a computing device 108 and a server system 110. Although a single computing device 108 is depicted, it is contemplated that a plurality of computing devices can be provided. In the depicted example, a user (e.g., an analyst) interacts with the computing device 108. The server system 110 includes one or more server devices 112. In some examples, the server system 110 can be used to develop, test and deploy one or more applications to one or more customer landscapes.

In some examples, the computing device 108 can communicate with one or more of the server devices 112 over one or more networks (e.g., the network 107). In some examples, the computing device 108 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the customer system 104 includes a server system 120. The server system 120 includes one or more server devices 122. Although not depicted, the customer system 104 can include one or more computing devices (e.g., similar to the computing device 108). In some examples, the customer system 104 is a customer landscape, to which one or more applications can be deployed (e.g., from the vendor system 102), and which executes the one or more applications.

In the depicted example, the external system 106 includes one or more server devices 124. Although not depicted, the external system 106 can include one or more computing devices (e.g., similar to the computing device 108). In some examples, the external system 106 is an audit data access system, which stores and selectively provides access to encrypted audit data. In some examples, the external system 106 is provided by a third-party service provider.

In some implementations, the network 107 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 112, 122, 124 includes at least one server and at least one data store. In the example of FIG. 1, the server devices 112, 122, 124 are intended to represent various forms of servers including, but not limited to a web server, an application server, a proxy server, a network server, and/or a server pool. In general, server systems accept requests for application services and provides such services to any number of client devices, e.g., the computing device 108, over the network 107.

As introduced above, a software vendor can deploy one or more applications to a customer landscape during a deploy-time, and the one or more applications can be executed on the customer landscape during a run-time. In some examples, and as described in further detail herein, the customer landscape can include one or more computing devices (e.g., client computing devices, server computing devices) and one or more data stores (e.g., databases) that are used to execute the one or more applications.

In some examples, the software vendor can provide run-time services. An example run-time service can include responding to and resolving errors that occur during execution of the one or more applications (e.g., incidents). For example, incidents can occur, which result from an error and/or unexpected performance of the one or more applications. In some examples, and in response to an incident, audit data can be provided and can include data associated with one or more parameters that may be relevant to the incident (e.g., an identifier associated with a computing device that resulted in an error, a time/date of the incident, a user that was logged in at the time of the incident, a number of processors being used at the time of the incident, an amount of memory being used at the time of the incident). In some examples, one or more analysts (e.g., users) at the software vendor can access the audit data to analyze and resolve the incident. In some examples, resolving the incident includes correcting one or more errors resulting in the incident to restore performance of the one or more applications.

In some examples, the audit data can include customer-sensitive data, which is accessed by the software vendor (e.g., the analysts) during resolution and/or correction of the incident. In some examples, and in view of data sensitivity/security concerns, the customer and the software vendor enter into mutual non-disclosure agreements (NDAs), in an effort to enforce data security policies (e.g., the audit data must not be used by the software vendor for other purposes than resolving the incident, employees must be trained not to share audit data with other vendor employees (no internal sharing of audit data)). Although such NDAs and/or other agreements intend to restrict access to the audit data and enforce policies, it can occur that the audit data is accessed by unauthorized users. In one example, this can pose a compliance risk to the customer. In another example, this can result in substantial damage, if such audit data is leaked outside of the customer and/or software vendor.

In view of this, and other considerations, implementations of the present disclosure are directed to securely storing audit data in an external network (e.g., cloud network) that is external to both the customer and the software vendor. Further, implementations of the present disclosure provide that only a set of dedicated analysis applications (e.g., one or more analysis applications) are able to access the audit data within the external network. From a security perspective, and as described more fully herein, implementations of the present disclosure grant limited, time-based access to audit data (datasets) that are required for analysis without using explicit access control mechanisms, which can be costly (e.g., in terms of resources required to implement), and which do not prevent data from being copied.

In further detail, implementations of the present disclosure enable a party to outsource audit data and access restrictions to the audit data are automatically specified for a selected group of users (e.g., particular vendor analysts). In some implementations, instead of an explicit access control system, which can be costly to implement, the present disclosure implements attribute-based encryption schemes. In some implementations, and as described in further detail herein, attributes are automatically identified for use of the attribute-based encryption schemes, and an attribute-based encryption scheme is automatically selected by distinguishing between static audit data and dynamic audit data.

In some examples, an attribute-based encryption (ABE) scheme is an encryption scheme that can be used to grant access to a data object (e.g., a set of audit data (dataset)) to any user that can provide required user attributes. That is, the ABE scheme defines user attributes required to access the data object, and access is granted to any user that is associated with the required user attributes. Example user attributes can include employment status (e.g., being an employee of the software vendor), having a particular role (e.g., analyst), and having been assigned an incident ticket (described in further detail herein). For example, if a user can show that they are an employee of the software vendor, that they are an analyst, and that they have been assigned an incident ticket (e.g., associated with particular audit data), the user is granted access to the audit data.

In some examples, different types of ABE are provided. Example types of ABE include ciphertext policy (CP)-based ABE (CP-ABE) and key policy (KP)-based ABE (KP-ABE). With reference to CP-ABE, ciphertext (e.g., encrypted audit data) is associated with an access tree and the encrypting party (e.g., the customer, a third-party service provider) determines the policy, under which the data can be decrypted, while the secret key is associated with a set of attributes. With reference to KP-ABE, the ciphertext (e.g., encrypted audit data) is associated with a set of attributes and the secret key is associated with an access tree. In KP-ABE, the encrypting party (e.g., the customer, a third-party service provider) does not define the privacy policy and has no control over who has access to the encrypted data. Instead, the encrypting party defines the set of descriptive attributes necessary to decrypt the ciphertext. In some examples, a trusted authority (e.g., the customer) generates a secret key and defines a combination of attributes, for which the secret key can be used.

In some implementations, the access tree and attributes are automatically provided based on organizational context(s). Example organizational contexts can include a structure of the application that is executed in the customer landscape (application structure), and software component structure of the software vendor. In some examples, the organizational context is provided based on context data, which can be used as one or more attributes for selective access to the audit data.

With regard to application structure (e.g., of the application executing on the customer landscape), the application can include an application hierarchy (APP-H). For example, the application can be represented by a tree structure, with the actual application being the root node and the underlying application building blocks being intermediate nodes, or leaf nodes. In some examples, underlying application building blocks include individual components such as workflow systems, databases, application servers, custom logic (e.g., Java 2 Platform Enterprise Edition (J2EE), Advanced Business Application Programming (ABAP)). In some implementations, every user with access to a node are automatically granted access to underlying intermediate nodes and leaf nodes.

By representing the application as a tree structure, each node represents an information technology (IT) artifact, and each artifact can have one or more attributes. By way of example, the application can include a travel expense application (e.g., for preparing and submitting travel expense reimbursement requests), which is composed of, for example, a user interface (UI) and an underlying workflow system. In this example, the workflow system links to a custom J2EE application and a standard enterprise resource planning (ERP) accounting application, and both the J2EE application and the ERP accounting application interact with respective tables of the same database. In this example, the UI can expose attributes, which can include, for example, UI uptime, type of consuming frontend (e.g., browser), number of individual requests served, number of attempted illegal entries (e.g., while the workflow may record current number of running instances), and the number of pending approvals. In some examples, applications providing the actual logic may record attributes, such as served requests and average response time for a single request, for example.

With regard to software component structure (maintained by the software vendor), a software component hierarchy (SWC-H) describes how different, isolated components may be used in the context of another component. An example high-level component can be an in-memory database, data processing, and application platform, which includes a database (DB) and an application service, where the database includes an engine and a driver. Using software component structures provided by SAP SE of Walldorf, Germany as a non-limiting example, a high-level component can be SAP HANA, which in turn includes HANA database (DB) and HANA extended application service (XS), where HANA DB includes an online analytical processing (OLAP) engine and a DB driver. In some example, the software vendor uses a software component management system for structured management of their produced software artifacts (e.g., artifacts that may be deployed to and executed on a customer landscape).

In some implementations, the application hierarchy and the software component hierarchy are context sources that provide context information and that can be used to determine one or more attributes, as described herein. In some implementations, additional context sources can be provided. Other example context sources can include an employee skillset database (e.g., storing data indicating qualifications/skills of particular employees (analysts), a human resources (HR) database (e.g., storing data indicating units that particular employees are assigned to, roles of particular employees), and an internal workflow management system.

Figure 2:
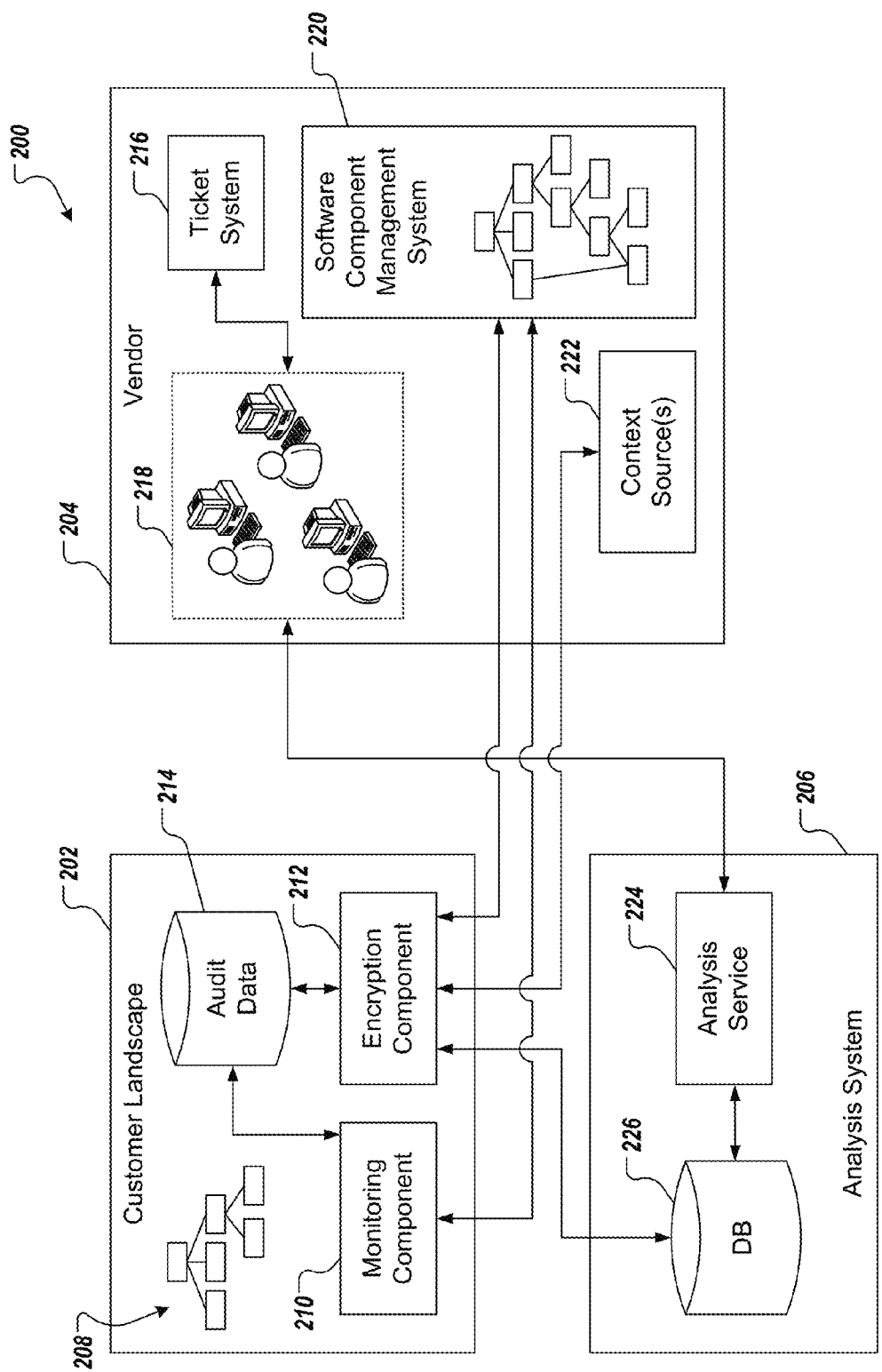
FIG. 2 depicts a schematic architecture in accordance with implementations of the present disclosure.

FIG. 2 depicts a schematic architecture 200 in accordance with implementations of the present disclosure. In the depicted example, the schematic architecture 200 includes a customer landscape 202, a vendor system 204 and an analysis system 206. The customer landscape 202 includes an application 208 (represented as an application hierarchy), a monitoring component (MC) 210, an encryption component (EC) 212 and an audit data database (ADDB) 214. In some examples, the monitoring component 210 and the encryption component 212 are each provided as one or more computer-executable programs executed by one or more computing devices. The ADDB 214 is an on-premise database, meaning that the ADDB 214 is provided within the customer landscape 204. In some examples, the ADDB 214 is provided as one or more computer-executable program executed by one or more computing devices, and one or more data stores for storing audit data, as described herein. In some examples, the customer landscape 202 of FIG. 2 is provided by the customer system 104 of FIG. 1, described above.

In some examples, the application 208 is deployed on and executed within the customer landscape 202, as described herein. In some implementations, the monitoring component 210 monitors execution of the application 208. For example, the monitoring component 210 can receive data that reflects execution of the application 208. Example data can include a number of calls, a number of processors executing the application, memory allocation, identifiers of devices involved in executing the application, one or more users logged into the application, and the like. In some examples, the monitoring component 210 compares received data to one or more thresholds, where, if one or more data values exceed respective thresholds, and/or one or more data values are below respective thresholds, it can be determined that an incident has occurred (e.g., the application has stalled). In response to determining that an incident has occurred, the monitoring component 210 aggregates audit data (e.g., to provide a data set), and stores the audit data in the ADDB 214. In some examples, the audit data that is to be aggregated can be determined based on the type of incident. For example, for a first type of incident (e.g., application stalling), a first set of audit data can be aggregated, and for a second type of incident (e.g., unauthorized access attempts) a second set of audit data can be aggregated, which is different from the first set of audit data. In some examples, and in response to determining that an incident has occurred, the monitoring component transmits a message to the vendor system 204, alerting the vendor system 204 that the incident has occurred. In some examples, the message includes sufficient data for the vendor system 204 to determine, which application is having an error and a type of error that has occurred.

In some implementations, the ADDB 214 processes the audit data to provide a set of dynamic audit data and a set of dynamic audit data. In some examples, processing the audit data includes determining a type of the audit data. Example static audit data can include the programming language, the protocol (e.g., structured query language (SQL), extensible markup language (XML), open data (ODATA)), port numbers, and service identifiers. In general, static audit data includes values that do not typically change during execution of the application. For example, the programming language of the application does not change. Example dynamic data can include the number of stalled processors, current memory consumption, and current number of blocked process steps in a workflow system, where "current" indicates the time of the incident. In general, dynamic audit data includes values that typically change during execution of the application. For example, the number of processors and/or the amount of memory used during execution of the application can change from moment to moment.

In some implementations, the ADDB 214 labels each audit data with one or more attributes. Example attributes can include, which application component the audit data is associated with, a time of the event, a type of the application, a degree of severity (e.g., completely stalled, intermittently stalled), and programming language(s) of the application. Accordingly, for a particular incident, the ADDB 214 provides a set of static data with respective attribute labels, and a set of dynamic data with respective attribute labels, which are provided to the encryption component 212.

In some implementations, the encryption component 212 determines the application hierarchy (APP-H) and the software component hierarchy (SWC-H). In some examples, the APP-H can be stored on the customer landscape 202 and can be retrieved by the encryption component 212. For example, the audit data can include an identifier associated with the application underlying the incident (e.g., the stalled application), and the encryption component 212 can use the identifier to query a data store and retrieve the APP-H for the particular application. In some examples, the SWC-H can be stored on the vendor system 204, as described in further detail herein, and can be retrieved by the encryption component 212. For example, the audit data can include an identifier associated with the application underlying the incident (e.g., the stalled application), and the encryption component 212 can use the identifier to query the vendor system 204 and retrieve the SWC-H for the particular application. In some examples, the SWC-H indicates types of data, such as static data and dynamic data. This information can be used to identify static audit data and/or dynamic audit data within the audit data, as described in further detail herein.

In some implementations, the encryption component determines additional context data. For example, the encryption component 212 can query one or more context sources of the vendor system 204, described in further detail herein, and can receive context data from the one or more context sources.

In some implementations, the audit data is encrypted by the encryption component 212. In some examples, the static audit data is encrypted using CP-ABE to provide encrypted static audit data, and the dynamic audit data is encrypted using KP-ABE to provide encrypted dynamic audit data. In some implementations, a set intersection is determined between APP-H and SWC-H. For example, the set intersection includes components that are in both the APP-H and the SWC-H. In some examples, static audit data and/or dynamic audit data within the audit data is identified based on the set intersection. The encrypted static audit data and the encrypted dynamic audit data can be collectively referred to as the encrypted audit data. The encryption component 212 provides the encrypted audit data to the analysis system 206, which stores and provides selective access to the encrypted audit data, as described herein.

In the depicted example, the vendor system 204 includes a ticket system (TS) 216, a group of vendor analysts (VAs) 218, a software component management system (SCMS) 220 and one or more context sources (CSs) 222. In some examples, the ticket system 216, the software component management system 220 and the one or more context sources 222 are each provided as one or more computer-executable programs executed by one or more computing devices and can include one or more data stores. In some examples, the vendor system 204 of FIG. 2 is provided by the vendor system 102 of FIG. 1, described above.

In some implementations, and in response to the occurrence of the incident, the ticket system 216 provides one or more tickets to the group of vendor analysts 218. For example, the monitoring component 210 can send a message to the ticket system 216 indicating the incident, and providing some level of data regarding the incident (e.g., the identifier assigned to the underlying application). In response to receiving the message, the ticket system 216 can issue the one or more tickets. In some examples, a ticket is a data set defining a task that is assigned to one or more analysts instructing the one or more analysts to resolve an incident associated with an application, and that provides some level of information associated with the application (e.g., an identifier assigned to the particular customer, an identifier assigned to the particular application, a type of incident (and/or types of error(s) underlying the incident). In some examples, a ticket is absent audit data that is determined to be sensitive audit data (e.g., audit data that could result in a security breach). That is, the ticket does not include any sensitive audit data. For example, the ticket can include non-sensitive audit data (e.g., an identifier associated with the customer, an identifier associated with the application), but is absent sensitive audit data (e.g., an identifier associated with users of the application, the current memory consumption, the current number of processors). In some examples, the SCMS 220 provides information regarding one or more applications and/or platforms provided by the vendor. In some examples, the SCMS 220 provides one or more SWC-Hs, for respective software components. In some examples, the encryption component 212 queries the SCMS 220 based on the application underlying the incident, and the SCMS 220 provides the SWC-H for the particular application to the encryption component 212.

In the depicted example, the analysis system 206 includes an analysis service (AS) 224 and an analysis database (ADB) 226. In some examples, the analysis system 206 is provided as one or more computer-executable programs executed by one or more computing devices. In some examples, the analysis system 206 of FIG. 2 is provided by the external system 106 of FIG. 1, described above. In some examples, the analysis system 206 of FIG. 2 is provided by a third-party service provider (e.g., a cloud service provider).

In some implementations, the ADB 226 stores the encrypted audit data received from the customer landscape 202. In some examples, the analysis service 224 selectively provides access to encrypted audit data in response to requests from one or more analysts in the group of vendor analysts 218. For example, an analyst can send a request to the analysis service 224. In some examples, the request can include a query that can be used to query the ADB 226 for encrypted audit data, and can include one or more attributes associated with the analyst. In some examples, the analyst is selectively granted access to the encrypted audit data based on the one or more attributes. That is, for example, if the analysts attributes are appropriate (e.g., match attributes associated with respective audit data that the analyst is requesting access to), results are provided to the analyst. In some implementations, searchable encryption can be used to enable querying of the encrypted audit data. For example, the analyst can send an encrypted query, and query results (e.g., encrypted audit data that is responsive to the encrypted query) are provided back to the analyst.

Figure 3:
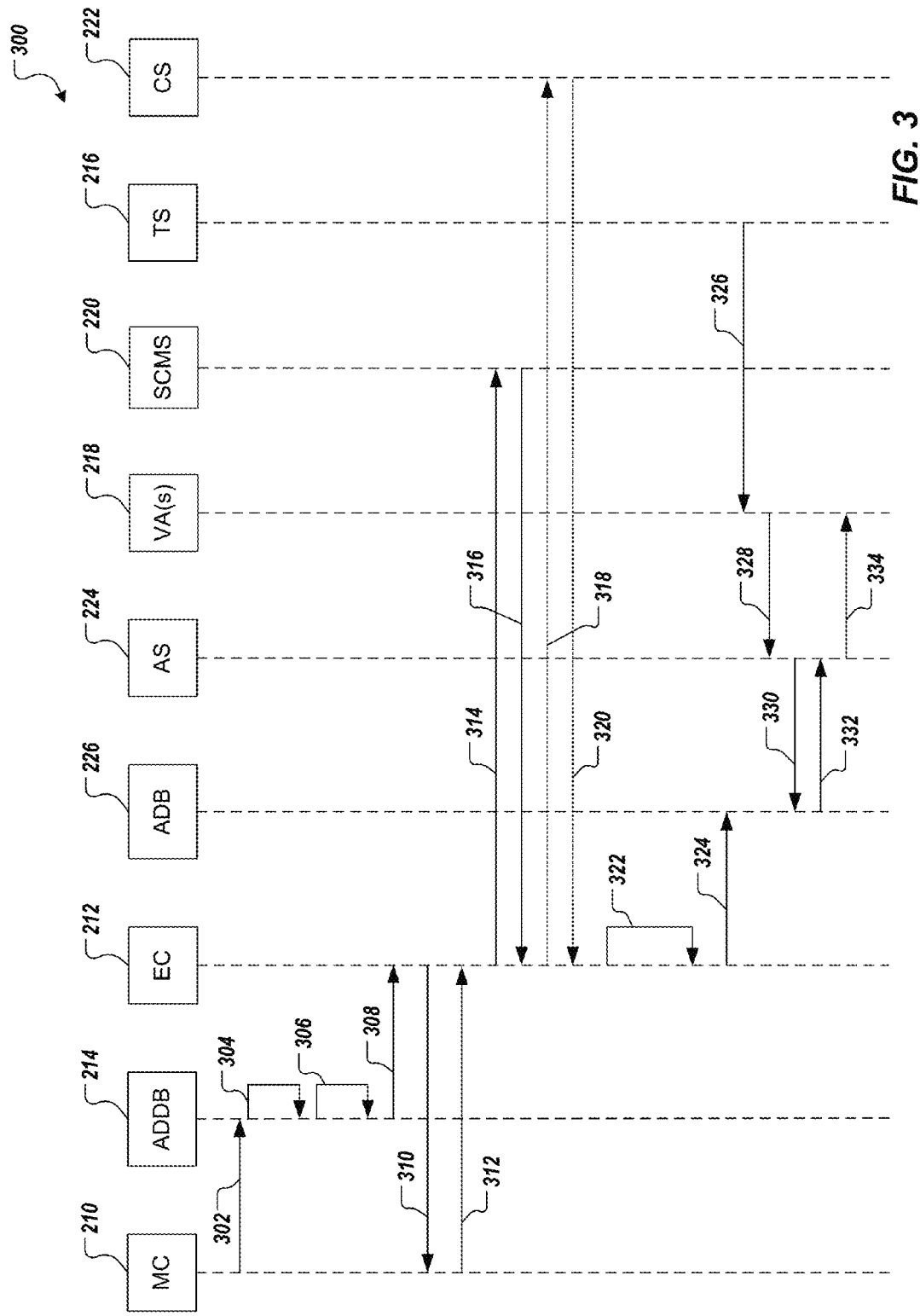
FIG. 3 depicts an example sequence diagram in accordance with implementations of the present disclosure.

FIG. 3 depicts an example sequence diagram 300 in accordance with implementations of the present disclosure. The example sequence diagram 300 depicts example requests from, responses to and operations performed by various components of the example schematic architecture 200 of FIG. 2 in accordance with implementations of the present disclosure.

The monitoring component 210 transmits (302) audit data to the audit data database 214. For example, the monitoring component 210 can monitor execution of the application 208 and, in response to an occurrence of an event, can provide audit data, as described herein, and can transmit the audit data for storage in the ADDB 214. The ADDB 214 processes (304) the audit data to provide a set of static audit data and a set of dynamic audit data, and labels (306) audit data within each set with respective attributes. The ADDB 214 sends (308) the labeled set of static audit data and labeled set of dynamic audit data to the encryption component 212.

In response to receiving the labeled audit data, the encryption component 212 requests (310) and receives (312) the APP-H for the particular application from the monitoring component 210. For example, the request can include an identifier assigned to the application, which the monitoring component 210 can use to select the corresponding APP-H. Also in response to receiving the labeled audit data, the encryption component 212 requests (314) and receives (316) the SWC-H relevant to the particular application from the SCMS 220. For example, the request can include an identifier assigned to the application, which the SCMS 220 can use to select the corresponding SWC-H. In some examples, and also in response to receiving the labeled audit data, the encryption component 212 requests (318) and receives (320) context information relevant to the particular application from the context source(s) 220. Example context information can include the name (unique identifier) of a component (e.g., HANA XS Engine Revision 1.2 SPS 8), where, the position of the component in the component hierarchy can be determined based on the name, as well as, for example, which analysts and/or developers are assigned to the component.

The encryption component 212 encrypts (322) the audit data to provide encrypted audit data. As described herein, the encryption component 212 encrypts each item in the set of static audit data using CP-ABE, and encrypts each item in the set of dynamic audit data using KP-ABE. Further, the encryption component 212 defines the access structure for the encrypted static audit data based on the set intersection of the APP-H and the SWC-H, and defines the access structure for the encrypted dynamic audit data based on the set intersection of the APP-H and the SWC-H and the context data. The encryption component 212 sends (324) the encrypted audit data for storage in the ADB 226.

The ticket service 216 provides (326) a ticket to one or more vendor analysts in the group of vendor analysts 218. A vendor analyst of the group of vendor analysts 218 sends (218) a query to the analysis service 224. The analysis service 224 selectively queries (330) the ADB 226 based on one or more attributes provided with the query, and the ADB 226 provides (332) a query result. The analysis service 224 sends (334) the query result to the vendor analyst that issued the query.

In view of the foregoing, a non-limiting example will be described in detail. In this example, a sales management application is executed on a customer landscape, and stops working. It is observed that the root cause of the stoppage is in an underlying messaging system. All software components associated with the messaging system are determined, and a set of tickets are opened in the software component management system of the software vendor. The underlying audit data is encrypted and is outsourced for storage and access under the attributes describing the application and software component hierarchy. Only a developer assigned to the open ticket for a software component as part of the customer application can access the encrypted audit data.

Figure 4:
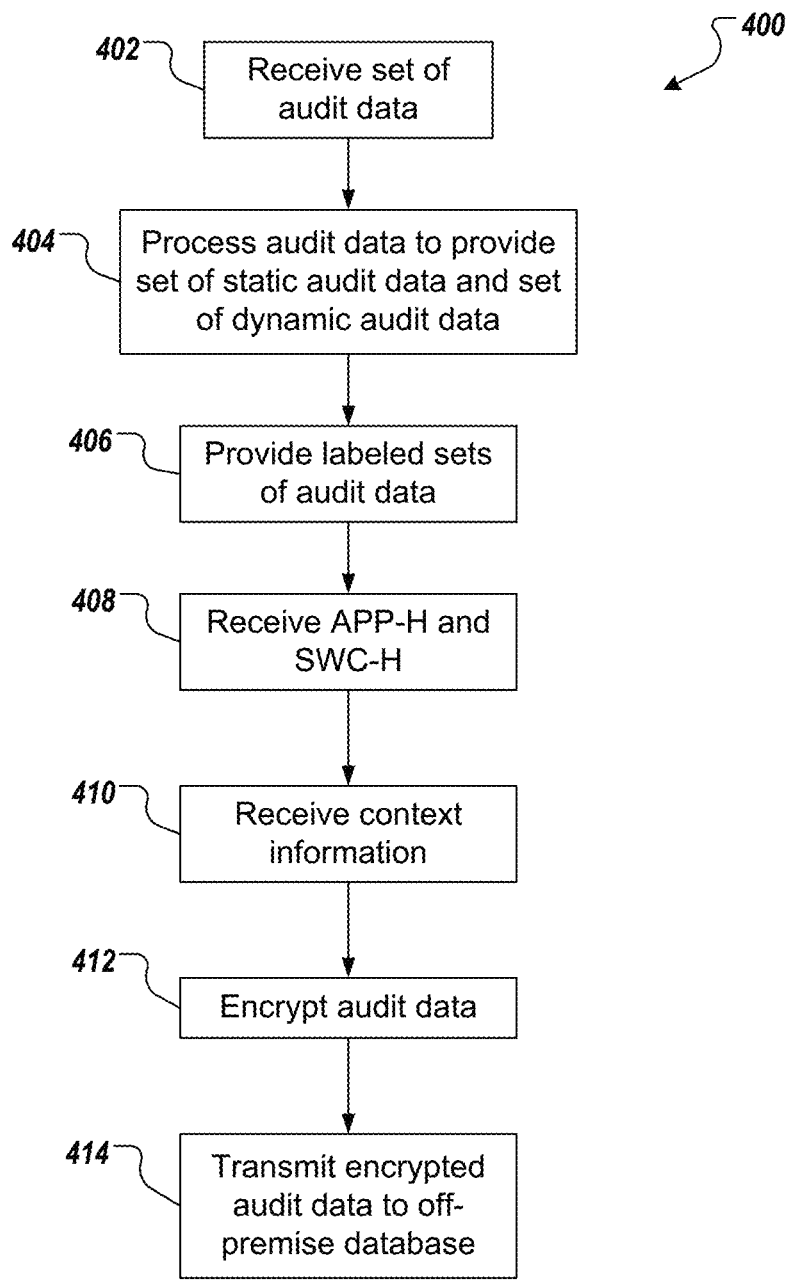
FIG. 4 depicts an example process that can be executed in accordance with implementations of the present disclosure.

FIG. 4 depicts an example process 400 that can be executed in accordance with implementations of the present disclosure. In some examples, the example process 400 can be provided as one or more computer-executable programs executed using one or more computing devices. In some implementations, the example process 400 is executed by the customer system 104 of FIG. 1 (e.g., providing the customer landscape 202 of FIG. 2).

Audit data is transmitted to an audit data database (402). For example, the monitoring component 210 can monitor execution of the application 208 and, in response to an occurrence of an event, can provide audit data, as described herein, and can transmit the audit data for storage in the ADDB 214. The audit data is processed (404). For example, the ADDB 214 processes the audit data to provide a set of static audit data and a set of dynamic audit data, and to label audit data within each set with respective attributes. The labeled sets of audit data are provided to an encryption component (406). For example, the ADDB 214 sends the labeled set of static audit data and labeled set of dynamic audit data to the encryption component 212.

An application hierarchy and a software component hierarchy are received (408). For example, in response to receiving the labeled audit data, the encryption component 212 requests and receives the APP-H for the particular application from the monitoring component 210, and the SWC-H relevant to the particular application from the SCMS 220. In some examples, context information is received (410). For example, the encryption component 212 requests and receives context information relevant to the particular application from the context source(s) 220.

The audit data is encrypted to provide encrypted audit data (412). For example, the encryption component 212 encrypts each item in the set of static audit data using CP-ABE, and encrypts each item in the set of dynamic audit data using KP-ABE. Further, the encryption component 212 defines the access structure for the encrypted static audit data based on the set intersection of the APP-H and the SWC-H, and defines the access structure for the encrypted dynamic audit data based on the set intersection of the APP-H and the SWC-H and the context data. The encrypted audit data is transmitted to an external database for storage and selective access (414). For example, the encryption component 212 sends the encrypted audit data for storage in the ADB 226.

Figure 5:
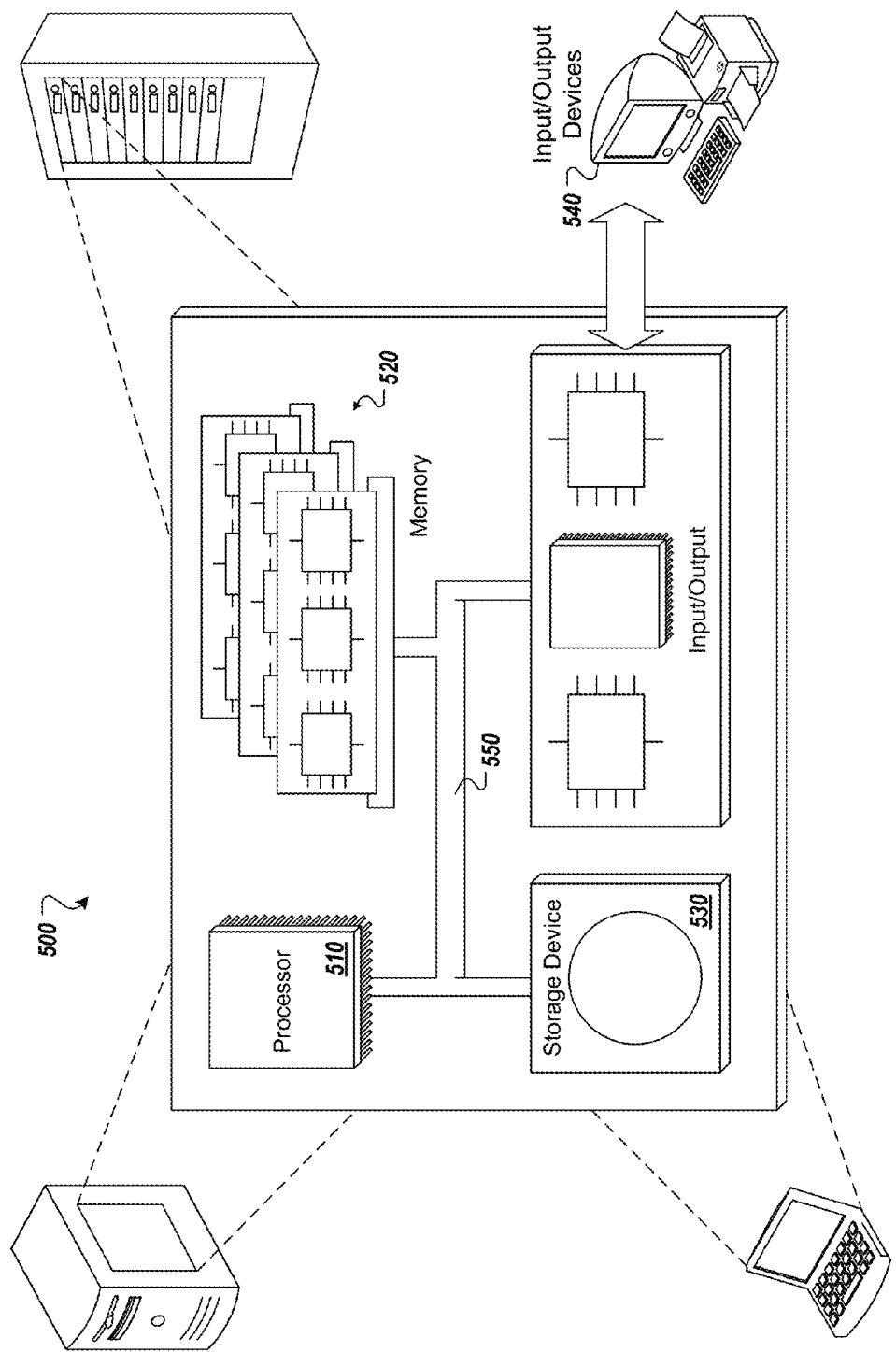
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for secure storage of and selective access to encrypted audit data, the method being executed using one or more processors and comprising:
   receiving, by the one or more processors, a set of audit data in response to occurrence of an incident associated with an execution of an application on a customer landscape;
   determining, by the one or more processors, a set of static audit data and a set of dynamic audit data based on the set of audit data, the set of static audit data comprising a first set of values associated to the application that do not change during the execution of the application and the set of dynamic audit data comprising a second set of values that change during the execution of the application, the second set of values corresponding to a time of the incident;
   receiving an application hierarchy from a component of a customer landscape, on which the application corresponding to the set of audit data is executed;
   receiving a software component hierarchy from a software vendor that provided the application, wherein access structures to respectively access first encrypted items in the set of encrypted static audit data and second encrypted items in the set of encrypted dynamic audit data are provided based on the application hierarchy and a software component hierarchy;
   encrypting, by the one or more processors, items in the set of static audit data using a first attribute-based encryption scheme to provide a set of encrypted static audit data, and items in the set of dynamic audit data using a second attribute-based encryption scheme to provide a set of encrypted dynamic audit data; and
   transmitting, by the one or more processors, the set of encrypted static audit data and the set of encrypted dynamic audit data to an off-premise database for storage and selective access.

2. The method of claim 1, wherein the first attribute-based encryption scheme comprises ciphertext policy attribute-based encryption, and the second attribute-based encryption scheme comprises key policy attribute-based encryption.

3. The method of claim 1, further comprising receiving context information, wherein an access structure for accessing encrypted items in the set of encrypted dynamic audit data is provided based on the context information.

4. The method of claim 1, wherein the incident results from an unexpected performance of the application executed on the a customer landscape.

5. The method of claim 1, wherein the incident results from an error in the application executed on the a customer landscape.

6. A non-transitory computer-readable storage medium coupled to one or more processors and having instructions stored thereon which, when executed by the one or more processors, cause the one or more processors to perform operations for secure storage of and selective access to encrypted audit data, the operations comprising:
   receiving a set of audit data in response to occurrence of an incident associated with an execution of an application on a customer landscape;
   determining a set of static audit data and a set of dynamic audit data based on the set of audit data, the set of static audit data comprising a first set of values associated to the application that do not change during the execution of the application and the set of dynamic audit data comprising a second set of values that change during the execution of the application, the second set of values corresponding to a time of the incident;
   receiving an application hierarchy from a component of a customer landscape, on which the application corresponding to the set of audit data is executed;
   receiving a software component hierarchy from a software vendor that provided the application, wherein access structures to respectively access first encrypted items in the set of encrypted static audit data and second encrypted items in the set of encrypted dynamic audit data are provided based on the application hierarchy and a software component hierarchy;
   encrypting items in the set of static audit data using a first attribute-based encryption scheme to provide a set of encrypted static audit data, and items in the set of dynamic audit data using a second attribute-based encryption scheme to provide a set of encrypted dynamic audit data; and
   transmitting the set of encrypted static audit data and the set of encrypted dynamic audit data to an off-premise database for storage and selective access.

7. The computer-readable storage medium of claim 6, wherein the first attribute-based encryption scheme comprises ciphertext policy attribute-based encryption, and the second attribute-based encryption scheme comprises key policy attribute-based encryption.

8. The computer-readable storage medium of claim 6, wherein the operations further comprise receiving context information, wherein an access structure for accessing encrypted items in the set of encrypted dynamic audit data is provided based on the context information.

9. The computer-readable storage medium of claim 6, wherein the incident results from an unexpected performance of the application executed on the a customer landscape.

10. The computer-readable storage medium of claim 6, wherein the incident results from an error in the application executed on the a customer landscape.

11. A system, comprising:
   a computing device; and
   a computer-readable storage device coupled to the computing device and having instructions stored thereon which, when executed by the computing device, cause the computing device to perform operations for secure storage of and selective access to encrypted audit data, the operations comprising:
   receiving a set of audit data in response to occurrence of an incident associated with an execution of an application on a customer landscape;
   determining a set of static audit data and a set of dynamic audit data based on the set of audit data, the set of static audit data comprising a first set of values associated to the application that do not change during the execution of the application and the set of dynamic audit data comprising a second set of values that change during the execution of the application, the second set of values corresponding to a time of the incident;

receiving an application hierarchy from a component of a customer landscape, on which the application corresponding to the set of audit data is executed;

receiving a software component hierarchy from a software vendor that provided the application, wherein access structures to respectively access first encrypted items in the set of encrypted static audit data and second encrypted items in the set of encrypted dynamic audit data are provided based on the application hierarchy and a software component hierarchy;

encrypting items in the set of static audit data using a first attribute-based encryption scheme to provide a set of encrypted static audit data, and items in the set of dynamic audit data using a second attribute-based encryption scheme to provide a set of encrypted dynamic audit data; and transmitting the set of encrypted static audit data and the set of encrypted dynamic audit data to an off-premise database for storage and selective access.

12. The system of claim 11, wherein the first attribute-based encryption scheme comprises ciphertext policy attribute-based encryption, and the second attribute-based encryption scheme comprises key policy attribute-based encryption.

13. The system of claim 11, wherein the operations further comprise receiving context information, wherein an access structure for accessing encrypted items in the set of encrypted dynamic audit data is provided based on the context information.

14. The system of claim 11, wherein the incident results from an unexpected performance of the application executed on the a customer landscape.

* * * * *